Sept. 23, 1958     O. K. KELLEY     2,853,167
SPEED RESPONSIVE FLUID CLUTCH WITH
VARIABLE PRESSURE CONTROLS
Original Filed March 31, 1945     5 Sheets-Sheet 1

Inventor
OLIVER K. KELLEY

Blackmore, Spencer & Flint
Attorneys

United States Patent Office 2,853,167
Patented Sept. 23, 1958

2,853,167

SPEED RESPONSIVE FLUID CLUTCH WITH VARIABLE PRESSURE CONTROLS

Oliver K. Kelley, Birmingham, Mich., assignor to General Motors Corporation, Detroit, Mich., a corporation of Delaware Continuation of application Serial No. 701,767, October 7, 1946, which is a division of application Serial No. 585,827, March 31, 1945, now Patent No. 2,633,760, dated April 7, 1953. This application February 23, 1954, Serial No. 411,667

16 Claims. (Cl. 192—87)

The invention relates generally to improvements in transmissions for automobiles and particularly to the control of clutch devices actuated by fluid pressure and controlled by variable forces derived from the operating conditions of vehicle power plants, as described in my U. S. Patent 2,633,760, filed March 31, 1945, issued April 7, 1953. This application is a continuation of my application S. N. 701,767, filed October 7, 1946, now abandoned, which was a divisional application of said patent.

Objects of the invention include the improvement and simplifying of control systems for operating one or more clutches for establishing drive ratios and the regulation of the operating pressure of pressure-responsive clutches in accord with the speed of the engine and the power or torque demand upon it.

The various improvements and novelties of these and additional features will appear in the following specification where their utilities are set forth in an operative sequence.

Figures 1, 9:
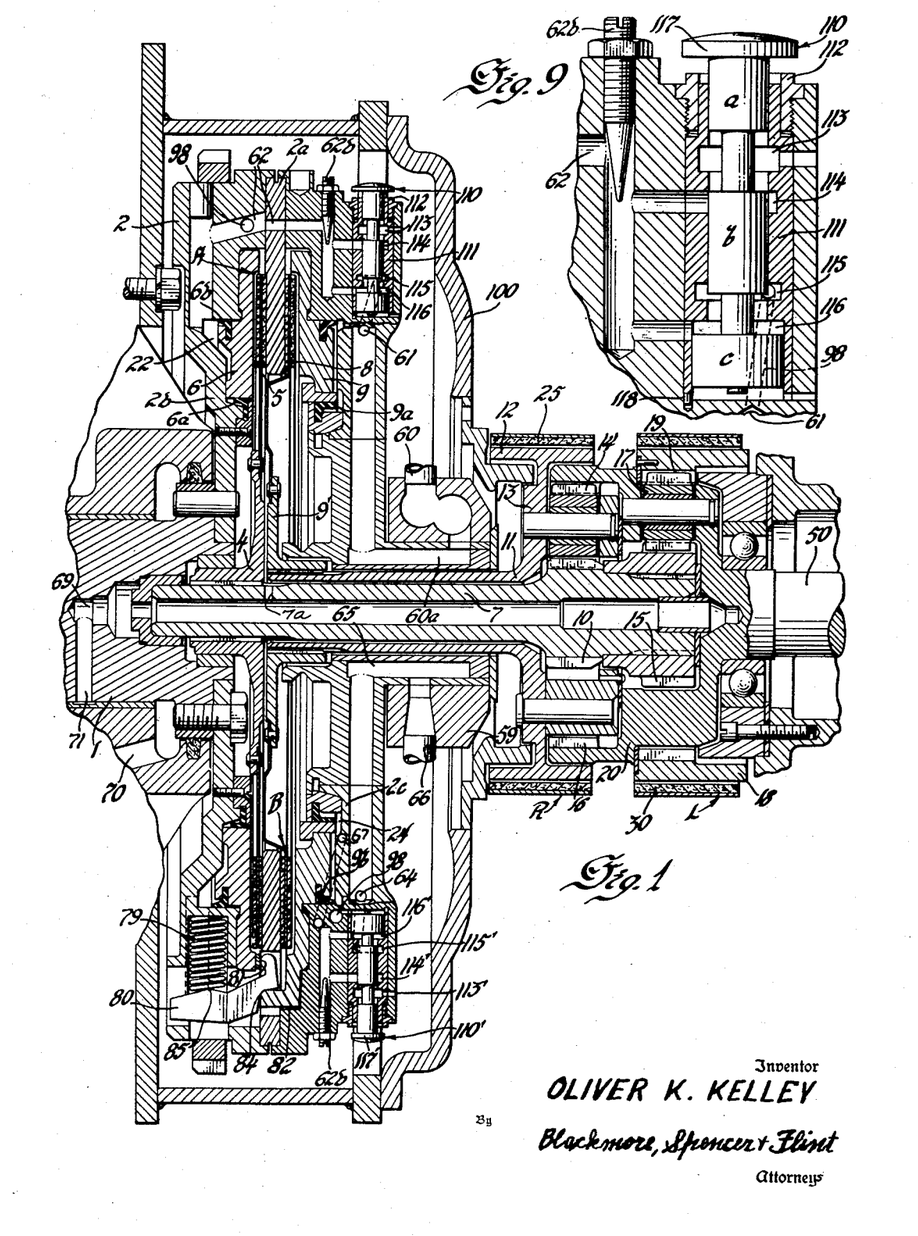
Fig. 1 is a vertical section of a transmission assembly built in accordance with the invention herein.
Fig. 9 is a sectional view of one of the centrifugal valve regulators of Figs. 1 and 2 utilized to control the rate of loading of the clutches in accordance with speed of the engine.
Figure 1A:
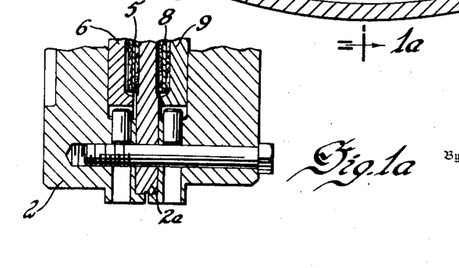
Fig. 1a is a section taken at a flywheel bolt on 1a—1a of Fig. 2 to show a detail of the clutch compartment assembly.

The vertical section of Fig. 1 shows the general arrangement of a transmission built in accordance with the invention. The engine is located at the left, and its shaft 1 is fastened to a flywheel drum 2 forming a driving member for two clutches A and B. The planetary gear unit adjacent the drum and clutches is termed herein the front unit, while the one at the right is called the rear unit. The driven or load shaft 50 projects at the right, and is driven by elements of both units.

The drum 2 is recessed to house the clutch operating mechanism for engaging one or both of the clutches A, B with the drum 2.

Means are provided to actuate the brake bands 25 and 30 for the reaction members for reverse and forward reduction drive respectively.

Means are also provided to vary the engine power, and a means responding to the power being generated, is connected to operate controls which determine the automatic variation of torque capacity of drive at various ratios established by the clutches A, B and brake 30. Brake 25 is only used for reverse ratio. Ratios are manually selected.

The hub 4 of clutch plate 5 forming part of clutch A is attached to transmission shaft 7 to which are affixed sun gear 10 of the reversing unit R, and sun gear 15 of the low speed unit L. The hub 9' of plate 8 of clutch B is attached to hollow shaft 11 integral with carrier 13 for planet gears 14 meshing with sun gear 10 and annulus 16. The drum 12 of carrier 13 is capable of providing drive reaction for reverse when brake 25 is applied to it.

The output shaft 50 is integral with carrier 20 for the rear unit, supporting planet gears 17 meshing with sun gear 15 and annulus gear 19, to which brake 30 may be applied; and is attached to annulus gear 16 of the front unit. The elements 5—4—7—10—15 always rotate together, and the elements 16—20—50 always rotate together at output shaft speed.

The reaction-supporting elements 12 and 18 and the presser plate 2a with drum 2 may be regarded as torque or drive-establishing elements.

Figures 3, 4:
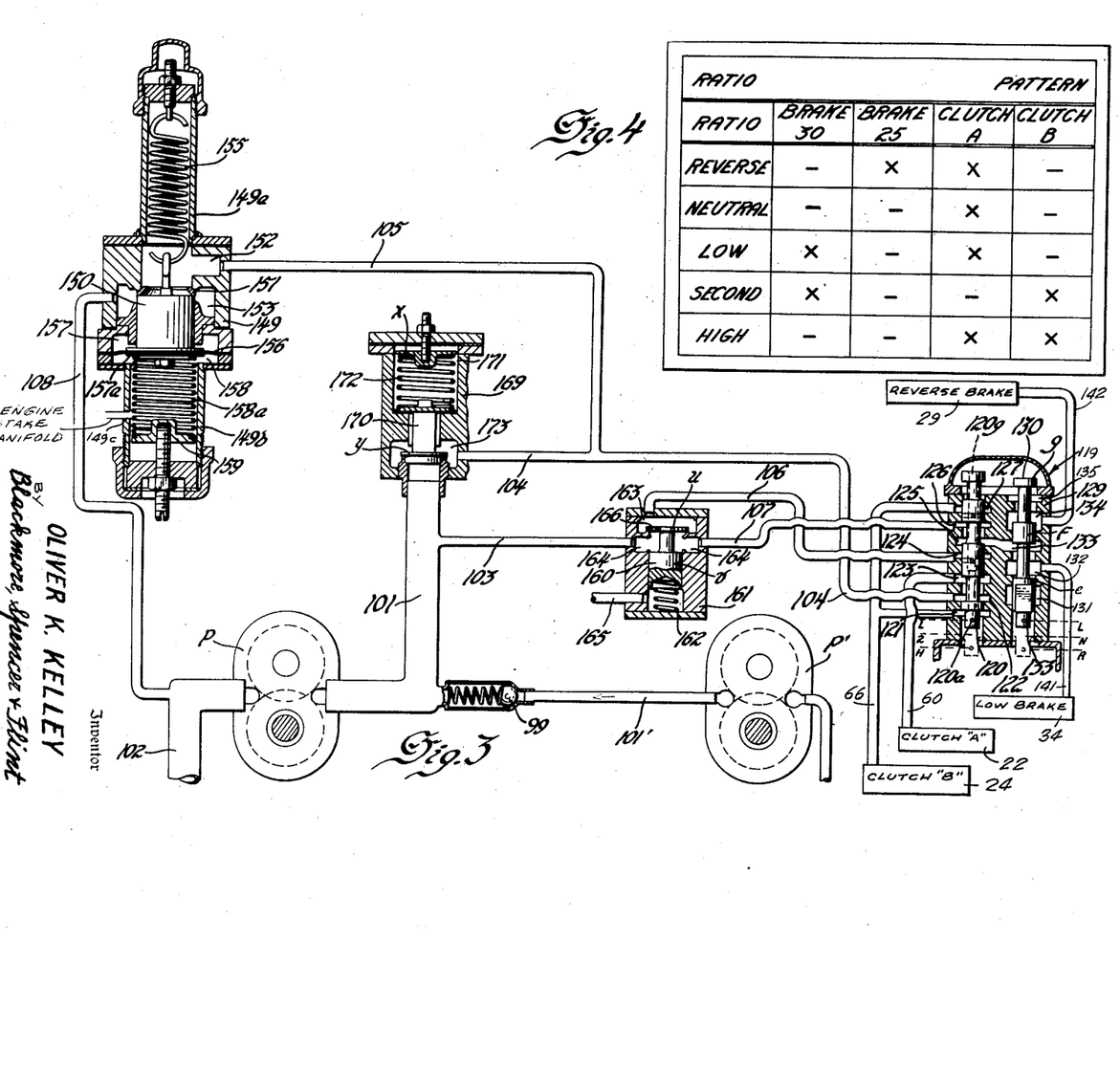
Fig. 3 is a diagram of the pressure control system for the Figs. 1 and 2 construction and shows the pressure-directing valving also shown in Fig. 6.
Fig. 4 is a table of the actuation pattern for the transmission brakes and clutches.

The paths of fluid pressure connection from the control system of Fig. 3 to the clutch compartment of Fig. 1 consist of feed passage 60 in a gland 59 which is connected to passages 60a and 61 in the drum 2 leading radially outward to the recess for valve 110, and thence to feed passage 62 and cylinder space 22 for piston 6 of Fig. 1; and feed passage 66 connected to gland passage 65, thence to feed passage 64 leading outward to the recess for valve 110' whence it connects by passage 67 to cylinder space 24 for clutch piston 9.

Under conditions where input torque is applied to shaft 7 and the sun gears 10, 15, the common fixed coupling of annulus gear 16 and carrier 20 to the load or output shaft 50 is the means for obtaining the needed compound couples for the various drives, as will be understood further.

For drive in low gear, clutch plate 5 is engaged with drum 2, causing the transmission shaft 7 with sun gears 10 and 15 to run at engine speed. The annulus gear 19 is held from rotation by the locking of brake band 30, the rear gear group of sun gear 15, annulus 19, planets 17 and output carrier 20 providing a reduction drive. Shift to second speed ratio is obtained by release of clutch A and engagement of clutch B, while brake 30 remains locked.

This couples carrier 13 of the front unit to the engine. Since annulus 16 is attached to the load shaft 50, the application of engine speed to carrier 13 tends to cause sun gear 10 to rotate ahead faster, which effect is transmitted by sun gear 15. Annulus gear 19 being stopped, a resolution of the coupling ocurs in the interaction among the gears 15—17—19 which drives output shaft 50 at a higher speed reduction ratio than the low ratio described above, when sun gear 15 alone transmitted the engine torque. The reactive coupling at 10—14—16 may be thought of as a means for dividing the torque through the elements 10 and 16, and that at 15—17—19 as recombining it. This dual torque path arrangement enables the designer to obtain the desired 2nd speed ratio between low and high, with a high efficiency due to the distribution of the friction losses in the arrangement.

Release of band 30 and coupling of clutch A while holding clutch B engaged, applies a direct locking couple through the gears and the rotative assembly then revolves as a unit, at engine speed.

For reverse drive, band 25 of the front unit is locked with clutch A engaged. This puts engine speed on the sun gear 10 which revolves annulus 16, carrier 20 and output shaft 50 reversely at a reduction ratio.

Transitions between forward and reverse, as for rocking a vehicle out of mud, sand or snow are made by alternately setting brakes 25 and 30 while holding clutch A engaged. When the drive in reverse is established, the annulus gear 19 of the rear unit is spinning backwards. Brake 30 may be applied during release of brakes 25 without violent torque reaction shocks to the mechanism. When drive is in low forward, carrier 13 is idling forward at an intermediate ratio, and brake 25 brings it down to zero speed. The driver may shift between the bands 25, 30, as quickly as is needed, with no special consideration for torque shock whatever, since as will be understood further, the clutch control system is arranged to ease the sudden application of torques, which assists in preservation of the life of the mechanism and for the ease and comfort of handling this equipment.

A pump P driven by the engine, which may be the engine lubrication pump, provides control pressure whenever the engine is running. Pressure pipe 101 in Fig. 3 is connected to the pump outlet. Pipe 102 is the pump suction line. Pump P' is driven from shaft 50 and supplies pressure line 101 thru line 101' and check valve 99 drawing from a common sump serving both the engine and the transmission assembly.

Figure 2:
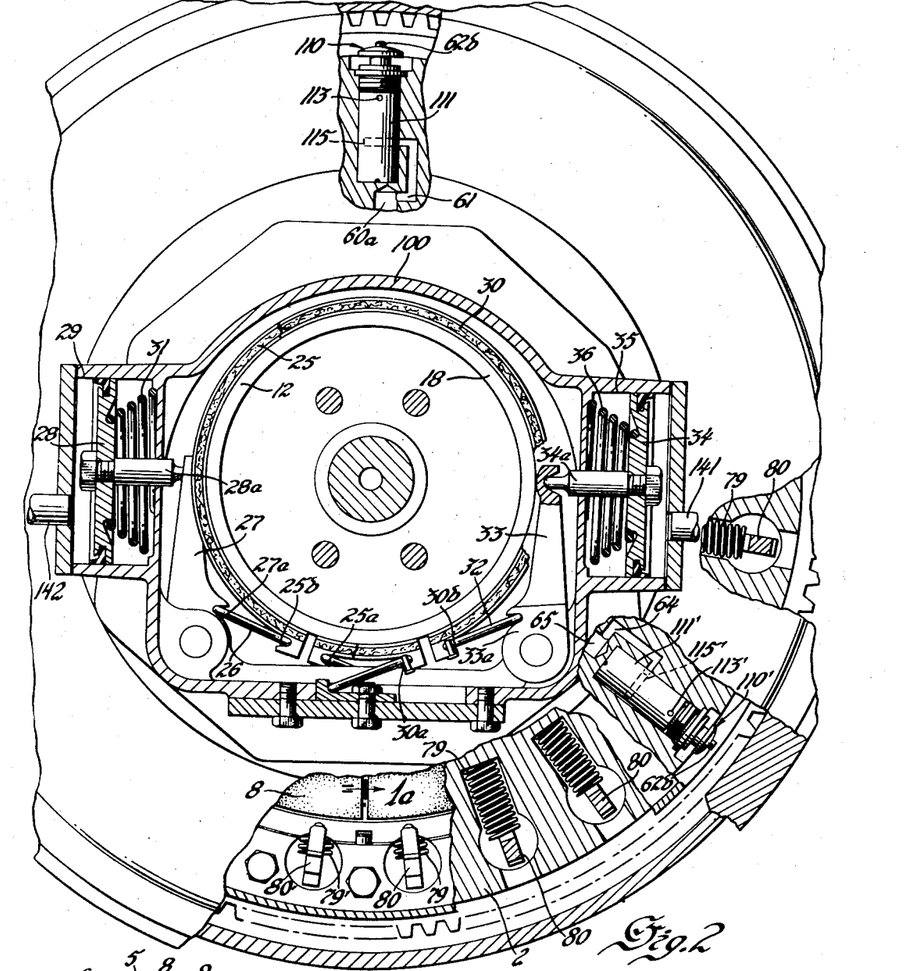
Fig. 2 is an elevation from the right of Fig. 1 partly broken away and partly in section.

The present invention provides a control of ranges of available pressure in the pump pressure lines from the low idling engine speed pressure up to maximum for performing the work of changing transmission ratio, of controlling the loading of the pistons 6 and 9 for the clutches 5, 8, and the servo pistons 28, 34 shown in Fig. 2 for brakes 25 and 30, and the holding of these pistons in actuating position for sustaining the desired torque.

The flywheel 2 is formed with a web 2a between the driven clutch plates 5 and 8, and annular pistons 6 and 9 are recessed in ring shaped cylinder spaces 22 and 24 in the flywheel, piston 6 being adapted to clamp plate 5 against web 2a, and similarly piston 9 to clamp plate 8 against 2a.

The cylinder space 22 for piston 6 is fed by fluid pressure from pipe 60, passage 61 and passage 62. The cylinder space 24 for piston 9 is fed by fluid pressure in passages 64 and 65, and pipe 66. The space between the plates 5 and 8 is vented by a drilled hole 7a in shaft 7, through the bore of shaft 7 and a contiguous hole 69 in shaft 1, passage 71 and pipe 70 to a space at atmospheric pressure to prevent trapping of fluid behind the clutch plates.

It will be noted that annular piston 6 is shaped to meet abutment 2b of the drum 2 and it slides axially with inner and external support on lateral extensions of the drum 2, the outer and inner circumferences having sealing rings 6a and 6b.

Piston 9 is formed to fit drum abutment 2c. The inner lip of the piston slides on a cylindrical extension of the drum 2, and is sealed with flexible washers 9a and 9b to hold pressure in the space 24 rightward from 9a, as fed through passages 66, 64.

One method of control, to be described in connection with Fig. 3 consists of a set of manual valves, a set of pressure regulating valves and a vacuum servo device connected to operate one of the valves, the manual control being arranged to feed pump pressure to or exhaust same from the clutch lines 60 and 66, and brake lines 141 and 142. The drive is initiated by locking brake 30 and closing clutch A, as controlled by the manual valving shown in Fig. 3 provided for the operator. As will be described further, the invention utilizes drive-determining valving operative such that the drive may not commence until increase of speed of the engine shaft above idling occurs and is not completed until for example, the valve 110 located in the feed line to clutch cylinder 22 is urged by centrifugal force and presses outward to feed port 116, such that the pressure in feed line 60 and space 22 to the left of piston 6 becomes sufficient to apply clutch 6. Under fast engine acceleration, valve 110 moves outward rapidly so that the rise of pressure for loading this primary clutch occurs quickly. The action of this valve is described in detail further, in connection with Fig. 9. It is to be observed that the acceleration of the engine as determined by the accelerator pedal (the position of which is a measure of torque demand) is variably controlled by the operator, and consequently if the operator advances the pedal slowly, the valve 110 in responding slowly to a low value of acceleration, provides a low rate of increase of pressure for loading the connected clutch.

The vehicle may move ahead in low gear until the manual control to be further described determines that clutch B shall be engaged and clutch A released.

The setting means of Fig. 2 for bands 25 and 30 are shown diagrammatically, the parts for the reverse band 25 being at the left and for the forward band 30 at the right. The low brake apply pipe 141, and the reverse brake apply pipe 142 are connected to ports 132 and 134 respectively of brake control valve 130 shown in Figs. 3 and 6.

The bands 25 and 30 are wrapped about their respective drums 12 and 18, and by reason of self-spring action are normally free. As shown in Fig. 2 anchor end 25a of band 25 is fixed adjustably to the housing 100, and the movable end is engaged at notch 25b by strut 26 held in notch 27a of lever 27 and operated by rod 28a of piston 28 in reverse cylinder 29 against release spring 31. Pressure in line 142 applies the low and second band 25, and relief thereof allows the spring 31 and the self-spring action of 25 to release same from the drum. Reference to Fig. 1 shows axial space between drums 12 and 18 at their peripheries, permitting the levers 27 and 33 to swing inward under fluid pressure applied to pistons 28 or 34.

Similarly, the end 30a of band 30 is fixed adjustable to the housing 100, the notched end 30b engaging strut 32 connecting to pivoted lever 33 worked by rod 34a of piston 34 in cylinder 35 fed by line 141, the pressure of which shifts the piston against spring 36.

Figs. 1 and 2 show part sections of the mechanical arrangement for releasing or unloading the clutches 5 and 8, for creating a centrifugal force to balance the hydraulic centrifugal pressure due to liquid trapped in the clutch actuating spaces 22 and 24. A plurality of springs 79 are seated in apertures in the web 2b of the flywheel 2 and press the radially-adjacent angular weighted levers 80 outward at 85. The portions 81 and 84 of weights 80 react against the abutting lips of the pistons 6 and 9 fulcruming on extension 82 of plate 9, so as to move the pistons axially away from each other, thereby freeing the plates 5 and 8 from drag.

The weight is taken so that the clutches engage when desired, under control of the shift valves 129, 130. This arrangement provides counterbalance force for the centrifugal effect of the mass of the oil trapped in the passages behind the clutch pistons so that there is no appreciable plate drag, even at either low or high engine speeds. When no oil is supplied to passages 60 and 66 and these passages are vented by the control system, there is nevertheless oil trapped in the chambers 22 and 24. Rotation of the drum 2 creates static pressure in these chambers due to centrifugal force and this pressure tends to engage the clutches. However, the arms 81 tend to release the clutches with a force measured by the speed of rotation and the masses of those parts of the levers 80 which are located to the left of the fulcrums 84. The masses of the weights are so chosen that they balance the forces due to centrifugal pressure head created within the spaces 22, 24 by rotation of the drum 2.

Thus at any speed, the pressure of liquid supplied through pipe 60 which is required to cause the clutch A to begin to engage, is determined by the springs 79, which also determine the range of effective pressures over which they are allowed to slip, and the point at which the engaging force is sufficient to carry a predetermined clutch torque.

Fluid pressure force, for example, applied to piston 6 is resisted by the forces of the springs applied to levers 80 at points 85. This spring resistance is met in the clutch cylinder 22 by a rise in pressure. With increased speed, the weighted arms 80 do not add to the resistance to be overcome, and at increased engine speeds the pump pressure required to engage the clutch 5 is not higher; even when the external portions of the weights abut the rim of the flywheel 2.

It is desirable to precede both the pumps with a suction line filter, so that the oil reaching the delivery line 101 or outlet, is reasonably free of dirt or sediment.

There are three line pressure valves controlling the output of the pumps, each operating in a separate branch of the flow, the branches being led to the ratio selection valving in a way which provides for different levels of operating pressure to meet different torque capacity needs of the transmission brakes and clutches.

The lowermost of these valves in the Fig. 3 diagram, is the pressure-divider valve numbered 160, and is located in a casing 161 having four connections, inlet, exhaust and two delivery outlets. The valve 160 has an upper boss $u$ and a lower boss $v$: the upper one having a slightly larger area than the lower. Spring 162 normally holds the valve 160 in its upper position, except as the pressure conditions modify its positioning. Upper space 163 is connected by line 106 to port 124 of valve 120. Pump feed line 103 connects to cross port 164 feeding line 107 leading to port 126 of valve 120. The lower spring recess under the valve 160 is open to exhaust at 165.

A small drilled passage 166 in the valve 160 may be used to connect the space 163 above with the lower recess connected to cross port 164.

Initial maximum line pressure in feed line 103, acting differentially on the larger and smaller exposed bosses of valve 160 and against spring 162, tends to maintain a port opening around the boss $u$ such that the pressure in space 163 rises to a selected fractional pressure value, and tends to close the valve upon a rise beyond that chosen pressure value so that the action is that of a pressure reducing valve. Assuming a uniform line pressure in lines 103, 107 and in port 164, the pressure delivery to port 124 of valve 120 will always be reduced, the valve acting as a pressure-divider and as a pressure range selecting valve.

As will be understood in detail further, the ratio control valve 120 operates to direct the servo pressure and may then alternate between admitting either the maximum or a reduced range of pressure to cross port 133 and thereby provide two separate ranges of pressure against piston 34 of the low speed ratio brake.

The reverse brake piston 28 is fed maximum pressure only, by valve 130 connecting ports 133—134.

Above the pump, in Fig. 3, is shown pressure supply controlling valve 170 in body 169. The valve 170 has an upper boss $x$ and a lower boss $y$ exposed to the pressure of supply space 101. Chamber 171 houses adjustable spring 172 pressing the valve downward, and chamber 173 is connected to line 104 having branch line 105 but connected to feed port 122 of valve 120. This line 104 supplies intermediate pressure to operate the clutch pistons 6 and 9 of Fig. 1.

The value of the intermediate pressure is varied in accordance with the variations in torque demand, and a third valve 150 is furnished for this purpose.

Valve 150 is a pump pressure regulating valve, located in valve body 149, and is formed with a tapered seat 151 closing upward against the pressure delivered from valve 170, in line 105 connected to chamber 152. Port space 153 connects to line 108 leading back to the suction line of the pump P. Adjustable tension spring 155 recessed in fitting 149a is attached to the upper end of valve 150, and opposes the pressure in chamber 152, so as to seat or partially close the valve upward.

The lower end of the valve 150 is fastened to diaphragm 156, closing chamber 158 from space 157, and compression spring 158a in 158 bears against the under face of the diaphragm retaining washer 157a, while pressing downward against retainer 159, adjustable by a fitting located at the lower end of extension of the valve body 149b.

Space 158 is connected to the engine induction manifold by a pipe 149c so that variations in manifold vacuum will vary the effective oil pressure in lines 103, 104 and 105 in accordance with variations in the engine power. This is accomplished by varying the leakage at seat 151 of valve 150, the variable pressure drop being reflected in all of the lines connected to pump output line 101. Variations in the degree of engine vacuum exerted in space 158 on the diaphragm 156 cause variation of the pressure sustained in line 105 by seating and unseating of valve 150, unseating action bleeding off pressure to the suction side of the pump thru line 108. There are consequent variations in line 104 which is constantly connected to line 105, and there are further possible reflections of such variation which appear in the main pump feed line 101 and line 103 connected thereto. The valve 170 held by spring 172 against the pump line pressure is normally open to provide pump feed to the intermediate pressure line 104, furnishing pressure to the cylinders of the clutch pistons 6 and 9 of Fig. 1.

The valve 150, spring 155 and diaphragm 156 operate as a dynamometric device or tell-tale, responding to variations in torque demand for controlling the relief action at 153, and thereby the modulation of the effective pressure in passages connected to space 152 and line 105.

Figures 6, 7:
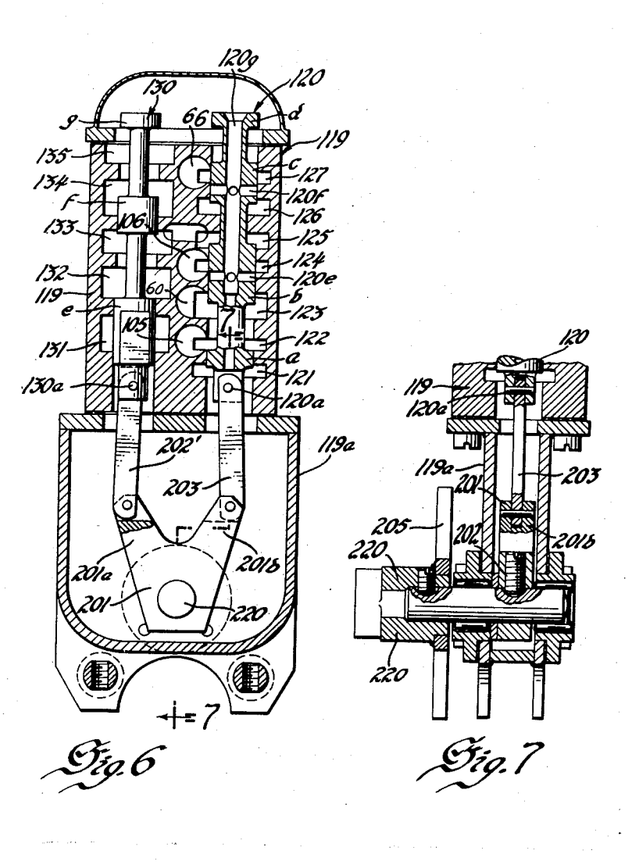

The manual control valve body 119 shown in Figs. 3 and 6 in section is open at one end for the parallel bores for valves 120 and 130.

The selector valve 120 at the right in Fig. 3 and at the right in Fig. 6 is formed for attachment of the external control means at 120a, and there are four bosses, $a$, $b$, $c$, and $d$, in order therefrom. The valve is bored at 120g centrally, and there are intersecting side passages 120e and 120f across the bosses $b$ and $c$ respectively.

The porting of valve 120 in body 119 is arranged with input ports from the controlled supply source, outlet ports to the two clutch cylinders, and a cross port 133 leading as shown in Fig. 3 to valve 130 which controls the pressure supply to the brake cylinders.

The seven ports from bottom to top in Fig. 6 are 121 for feeding clutch cylinder 24 via feed line 66; 122 inlet from the line 104; 123 leading to clutch cylinder 22 via feed line 60, 124 inlet from line 106; 125 to cross port 133 delivering to the planetary brake control system; 126 inlet from the supply line 107; and 127 a supplementary delivery port to feed line 66 for clutch cylinder 24.

Selector valve 130 directs the servo pressure for controlling the transmission brakes, is formed at 130a for attachment of the external control means, and has three bosses $e$, $f$, and $g$ in order from bottom to top in Fig. 6. Its bore has five port spaces, in this sequence, 131 open to exhaust; 132 leading by line 141 to the forward reduction brake cylinder 35; 133 receiving input from port 125 of valve 120; 134 connected to line 142 for reverse brake cylinder 29 and 135 open to exhaust.

As shown in Fig. 3, by the horizontal lines marked L for "Low," 2 for "2nd" and H for "High," the valves move down from the indicated "Low" speed ratio positions for changes to 2nd, and High. In the low ratio setting the feed from line 107 enters port 126 of valve 120, passes from port 125 to port 133 of valve 130, and is delivered to line 141 leading to cylinder 35 of low speed brake 30. Because of the magnitude of the torque reaction force for low gear drive, this is, in the described system a high fluid pressure connection. The pressure feed from the intermediate pressure line 104 enters port 122 of valve 120 and is delivered by port 123 to line 60 supplying clutch cylinder 22. The letter R stands for "Rev." or reverse shift in Fig. 3, and the letter N for "Neutral."

As will be understood further, movement of the controls to "Neutral" maintains pressure in clutch line 60, but valve 130 is shifted to shut off the flow from port 125 to port 133, and relieves brake cylinder line 141 and port 132 to exhaust at port 131.

The horizontal lines marked at the right of valve 130 marked L for "Low," marked N for "Neutral" and marked R for "Rev." indicate the positions of the valve for these ratio shifts. It will be observed that the sequence of the shift pattern is from bottom to top by three steps for valve 130 to establish reverse, neutral and low, and for valve 120 to move from top to bottom by three steps for low, second and high selection action.

Valve 130 having been placed in upper position for "Low" remains there for "2nd" and "High," the movement of valve 120 to "High" cutting off the cross feed to port 133 when it is moved to the end point position.

Valve 130 is moved between its limit position and its central position for shifts to and from "Neutral," and enables the operator to rock the vehicle out of sand or mud by continuous resetting of valve 130 only, as will be further apparent with study of the external control mechanism.

Movement of valve 120 to "2nd" position connects together ports 121 and 122, delivering pressure from line 104 to line 66 leading to cylinder 24 of clutch 8. Cross port 120e of valve 120 comes opposite port 123 of clutch line 60, releasing the pressure to disengage clutch 5. Ports 124 and 125 are connected, joining line 106 to the brake cross port 133 to deliver a lower pressure to brake line 141. It is desirable in second speed ratio to reduce the torque reaction holding force in a proportion representing the gear ratio of torque differential.

Moving of valve 120 to third or top gear position cuts off the pressure from brake 30, applies pressure to clutch A, and raises the pressure on clutch B to full line pressure.

In 2nd speed, line 106, ports 124, 125, 133 and 132 had supplied brake line 141, and cross port 120f was blocked between ports 125 and 126. Movement of valve 120 to 3rd speed position blocks delivery from line 106 and the cross port f connects 133 to exhaust, which releases pressure in brake cylinder 35 on piston 34, the springs 36 serving to force the fluid out quickly through the exhaust passages.

Clutch B had been engaged in 2nd speed by the pressure in line 66 from ports 121, 122 and line 104 while the delivery line 60 for clutch A had been connected to exhaust by cross port e of valve 120.

Shift of valve 120 to 3rd position isolates exhaust cross port e between ports 122 and 123, while port 123 becomes connected to 124 and to line 106 to deliver pressure to line 60 and cylinder 22 of clutch A. Meanwhile the supply from line 104 to port 121 of line 66 for clutch B has been cut off and the full pump line pressure from 107 has been admitted through ports 126, 127 to line 66.

In examining the control system shown in Fig. 3 one finds that the pressure furnished by pumps P, P' is developed in the pressure line 101, which pressure serves to open valve 170 at a relatively low value, and build up, thereafter, a servo pressure in lines 104 and 105 which is conditioned by the changes of engine vacuum, reflective of the engine torque.

Manually controlled directing or distributing valve 120 may be stationed, as shown in Fig. 3 to admit this conditioned pressure via port 123 to delivery line 60. This delivers the conditioned pressure to cylinder 22 of clutch A, of Fig. 1, as permitted and further conditioned by centrifugal valve 110, which latter valve meters the feed to passage 62 and clutch servo cylinder 22.

The term "supply lines" is used to denote the connecting lines leading from the supply pumps, such as 101, 104-5 and 103. The term "delivery lines" is used to identify the connections between the valves 120, 130 and the clutch servo cylinders 22 and 24, such as 66 and 60.

Both of valves 160 and 150 may be considered regulating valves. Valve 170 determines the intermediate servo pressure acting in the supply lines 104, preceding the manual valves, and in that sense is regarded as a regulating valve, in the manner described preceding.

In Figs. 1 and 2, the web 2c of flywheel 2 is shown recessed for valve 110. The valve 110 is for the purpose of applying a speed response regulation to the torque capacity of the clutch A. It is located in a bore of the flywheel drum 2, and retained by ported sleeve 111 held in place by screw collar 112, as shown in Fig. 9.

The sleeve is bored to two internal dimensions to accommodate the valve 110, and is cross ported at 113 for exhaust, at 114 for clutch exhaust, at 115 for pressure feed connection, and at 116 to connect with the outlet of port 115, and leading to passage 62 for clutch cylinder 22.

Valve 110 has bosses $a$ and $b$ of one diameter, and boss $c$ of larger diameter, and is weighted at 117, the weight being attached by a common lock screw or similar means. The valve 110 operates as a centrifugal valve or speed-responsive element.

The adjacent passage 62 is equipped with an adjustable screw valve 62b to afford exact control of the pressure flow into and out of passage 62. The sleeve 111 is held from rotation by locating lug 118 recessed in the body of the drum 2.

The valve 110 receives line pressure in port 115 connected as described herein to clutch feed line 60 of Figs. 1 and 3, and under rotation of drum 2, the mass of weight 117 added to the mass of the valve and that of the body of oil radially inward of boss $b$, if any all provide an outward force which at a given speed of rotation moves the valve to open port 116, while the upper face of boss $b$ closes off port 114 from exhaust 113.

Directed pressure from line 60 is therefore available to apply a loading pressure to clutch piston 6 in cylinder 22 and cause torque to be delivered to the shaft 7 of the sun gears 10 and 15.

The lower or inward face of boss $b$ is of smaller diameter than the adjacent upper face of boss $c$ and consequently the larger force on boss $c$ due to the pressure delivered by port 115 is to tend to move the valve 110 inward. When the speed of drum 2 falls to a given low value, the excess of force upon the upper face of boss $c$ of valve 110 is greater than the centrifugal force, and the valve moves inward connecting ports 113 and 114, thereby relieving the pressure in line 62. Since the clutch release springs 79 of Figs. 1 and 2 are immediately effective to force the piston away from contact with plate 5, whenever the fluid pressure in 62—22 is released, and since the centrifugal effect on the body of oil moved by the piston is added to the force available to relieve the pressure, the release of clutch torque occurs rapidly, and the fluid drains freely at port 114.

When there is a sudden fall in speed of drum 2 the valve 110 will open clutch line 62 to exhaust at 113. It is obvious that the differential pressure effect enables the valve to operate without what may be termed a "governor" spring. The differential areas of bosses $b$ and $c$ are taken with respect to each other, to the line pressure range within which the clutch is to operate and to the engine speed characteristics, so that full release of the engine from the load occurs without stalling the engine, such as would be desirable when the vehicle brakes were suddenly applied.

The relative value of the differential pressure effect to the speed effect is a matter of design, and the combined effect may be utilized as a starting control for moving the vehicle from rest, as a ratio-shift transition control upon the rate of application of the clutch loading pressure during the shift interval, and if desirable as a continuing control constantly operating during the entire drive period. If the latter is desired, the clutch line pressure variation provided by the centrifugal valve 110 may be proportionalized so that its controlled range of leakage at port 113 extends over a high percentage of the normal driving range. This proportionality is likewise a matter of design. It should be clear that valve 110 by alternate venting action at port 113 and feeding at port 116 of passage 62 open to clutch cylinder 22 provides a metering of pressure to passage 62 and cylinder 22, rising with speed of drum 2.

Clutch A in the present disclosure, is not only used for picking up the drive, but is released for the next ratio and is re-engaged for the top gear drive. It must therefore serve at one time as a vehicle starting clutch, and at another time as a ratio shift clutch.

Since it is desired that a smooth ratio transition without releasing torque be provided, the net effective clutch loading force which is exerted on clutch A is therefore conditioned by the existing torque requirement for the particular transmission ratio sustained by the clutch, and further by the power conditions existing at the time of ratio shift.

The use served by centrifugal valve 110 is therefore two-fold, first to determine the primary interval of clutch engagement and disengagement, and second, to take part in the regulation of clutch loading pressure during a portion of variable ratio drive.

The valve 110' for regulating the loading of clutch B is identical in principle with valve 110, but its weight 117' may be made smaller. Upon sudden deceleration, valve 110' would lose its centrifugal force effect first, and open line 64 for clutch B to exhaust before valve 110 connected the cylinder 22 of clutch A to exhaust at port 113.

Should the manually controlled valve 120 of Fig. 3 be positioned to deliver pressure to clutch B, the vehicle may be started from standstill by the action of valve 110', but since its weight 117' is less than 117, the speed at which the clutch B is energized with a given loading is higher, so that the engine torque available will be high enough to avoid stalling, for the available engine torque will be greater at a higher speed.

This general form of centrifugal valve is shown in Letters Patent to W. L. Carnegie, U. S. 2,221,393 issued November 12, 1940, where it is used to regulate the variable starting torque controlled by the transmission friction band. It is further shown as a control for the ratio shifter valving in Letters Patent U. S. 2,204,872 issued June 18, 1940, to Earl A. Thompson.

The centrifugal valve 110 is proportioned with a closing relationship, outward radially with respect to port 114, so that with increased speed, the closing force resulting from its mass and speed becomes greater, tending to seal off the leakage path for oil around the valve to exhaust passage 113, which causes a rise of pressure therefore in feed passage 62 leading to cylinder space 22 behind piston 6, from the feed line 60 of Fig. 3.

Valve 110 by its centrifugal action conditions the effective loading pressure on clutch 5 and thereby varies the torque capacity of the clutch in accordance with speed.

Valve 110' seats radially to close port 114', prevents exhaust at 113' and creates a rise of pressure in passage 64 feeding cylinder 24 of piston 9 which loads clutch B for driving. The valve 110' is radially operative with a force varying with engine speed similar to valve 110 noted above.

Since both valves 110 and 110' close against the existing pressures in the clutch feed lines and cylinders, they therefore respond to the fluid pressure conditions as determined by the controls between the pump supply and the feed passages 62 and 64.

The valve 110' for clutch B is arranged by its design factors to respond for closing the port 114' so as to become effective at a lower speed than that at which valve 110 functions to yield a particular loading pressure characteristic.

Assuming the pressure cut off from line 60, the body of fluid trapped to the left of the piston 6 possesses centrifugal force. The spring-and-weight system arrangement at 79—80 is required to release the plate 5 with no drag whatever.

The admission of pressure to line 66 initiates the loading of plate 8 by piston 9, and the speed effect on valve 110' causes the fluid pressure load thereon to be expressed as a speed factor of given value.

The instant when torque on clutch plate 5 ceases and is all assumed by plate 8 is preceded by a short interval when torque is momentarily being carried on both plates.

This is accomplished upon upshift to 2nd by the valve 120 and its action. When the ratio pressure directing valve 120 exhaust line 60 and delivers pressure to line 66, the pressure level desired is already available for loading piston 9.

This line pressure being exerted to move the piston 9 and overcome the resistance of weights 80 and springs 79 of the clutch release mechanism of Fig. 1, must also build up in accordance with the timing effect of the orifices as controlled by valve 120, and these orifice values are taken so as to avoid sudden assumption of torque by clutch 8. A further factor assists this action.

Time must be allowed for the pressure condition within the spaces 22 and 24 and to permit piston 9 to move over and load the clutch plate 8, and to release the piston of plate 5.

The delivery of pressure to line 66 by clutch control valve 120 simultaneously connects line 60 to exhaust through the cross port 120e and the hollow center of valve 120 from port 123. The small area of the outflow passages in the cross porting establishes a dwell in the relief of the pressure behind piston 6.

The invention therefore provides a control which conditions the automatic action derived by pressure from the pumping system, and without reactive force upon the manual controlling means.

Fig. 4 labeled "Ratio Pattern" shows by $x$ which clutches and brakes are energized to determine the various ratios.

For convenience, "maximum" pressure range is considered that delivered direct by the pump to line 107. This pressure range is used in the low and reverse brake cylinders and in clutch cylinder 24, for high gear drive.

It will be noted that the clutch A valve connections and feed line are pressure-fed when the Fig. 6 valving is set for neutral.

It seems obligatory upon the applicant to explain with full clarity the special characteristics of the control system and the methods provided for obtaining both forms of clutch loading control, namely, that achieved by the operation of valve 150 which measures in the recited sense, the degree of existing engine torque, and the further pressure-determining effects obtained by the operation of the differential area valve 160 in conjunction with the selecting action of valve 120.

For obtaining drive in low gear, the pressure from line 104 is delivered by valve 120 from port 122 to port 123 open to passage 60 and clutch cylinder 22, for energizing clutch A. This pressure is varied by the described operation of regulating valve 150. At the same time the valve 170 is determining whether or not there shall be any pressure available to provide this stated operation.

The above recitations cover also the status of clutch A when the hand control is set for neutral.

In making the transition from low to second, the clutch conduit 60 is exhausted and the clutch conduit 66 for clutch B is supplied from passage 104, port 122, and port 121, connected to servo cylinder 24; this occurring while passage 60 is connected to exhaust through port 123 and the registering portion of valve 120. This pressure is likewise regulated by the action of regulating valve 150 and as stated above, by the pressure created by the opening of minimum pressure cut-off valve 170.

The shift from second to high gear drive results in the applying of actuator pressure to clutch B by a different route than that above described for drive in second. The passage of the pressure to port 121 has been cut off and the feed is from line 107 and by ports 126, 127 to conduit 66. Furthermore, the loading pressure for clutch A is now derived by the action of reducing valve 160, the servo pressure in clutch cylinder 22 being obtained from its conduit 60 through the ports 123 and 124 from the reduced pressure connection 106.

It is therefore apparent that clutch A while being subject to the variations of pressure caused by the action of valve 150 in low and in neutral, is also subject thereover in high to the pressure level reducing action valve 160. It is also worthy of note that the valve 170 determines in all cases the lower limit of pressure under which either of clutches A or B may be loaded, because at below a given pressure, the valve 170 seats at y until the combined pump pressures in the main outlet connection 101 is sufficient to hold valve 170 open.

The fractional pressure range is the lowest of the three stages of pressure level ranges, and may be considered as low pressure. This is used in the low ratio brake cylinder for 2nd gear operation, and in the clutch cylinder 22 during high ratio setting.

Intermediate pressure range as noted herein is furnished entirely by line 105, and is used exclusively in clutch cylinder 22 for reverse, low and neutral, and in clutch cylinder 24 during 2nd speed drive.

Studied in conjunction with the foregoing description of the operation of valves 120 and 130 in connection with Fig. 3, Figure 4 clarifies the shift pattern herein, believed novel in transmission controls.

Figure 5:
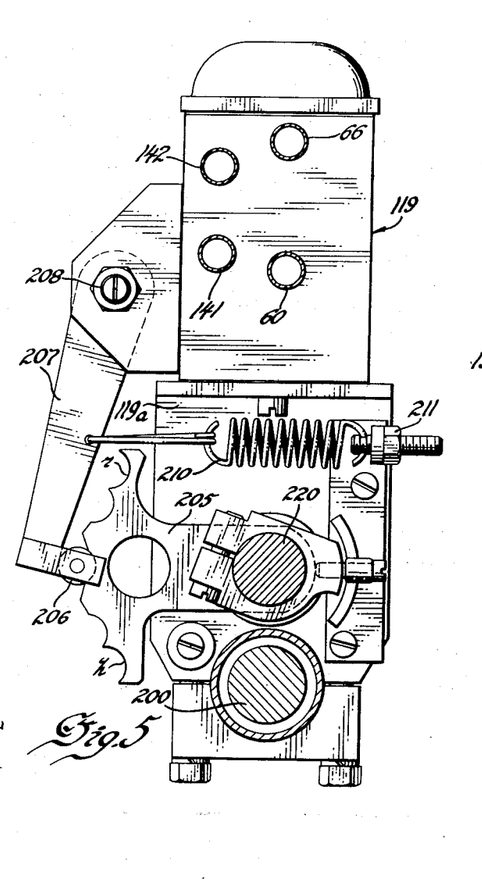
Figs. 5, 6 and 7 are views of the external and internal parts arrangement for the control mechanism of the manual control valving of Fig. 3. The linkage of levers to the valving is shown in a sectioned portion of Fig. 6 in a plane below that of the view of Fig. 5, and the mechanism of Fig. 7 is shown as sectioned on line 7—7 of Fig. 6.

In Fig. 5 the drawing shows the control valve casing 119 bracketed to steering column 200. A mechanical lever device is provided in compartment 119a, operated by control shaft 220 for moving the valves 120 and 130 shown in Fig. 3. Fig. 6 shows the internal connections of the control elements.

The Fig. 7 view, taken at 7—7 in Fig. 6 shows the detail of the mechanical interlinkage.

Plate 201 keyed to portion 202 of shaft 220 is formed with two radial arms 201a and 201b pivoted to links 202' and 203 which are in turn pivoted to the valves at 120a and 130a, so that rotation of plate 201 positions the valves at various port connecting stations.

To assure proper port registry of the valves for the required control stations, a cam plate 205 is attached outside casing 119a to shaft 220, and its cam notches project to the left beyond the casing 119a, in Fig. 5, where they are intersected by roller 206 of arm 207 pivoted at 208 to valve casing 119, the adjustable tension spring 210 being anchored by screw fitting 211 and exerting a measured pull on the arm 207 for loading the roller 206 against the cam plate 205.

The angular positions of the notches are taken to correspond to the valve stations for the control functions required.

Referring back to Fig. 3, it will be understood that in the forward drive control sequence from low to high, valve 120 progressively emerges from the casing 119 while valve 130 remains in its inner position; and that in the sequence from low through neutral to reverse, the valve 120 remains in its inner position while 130 emerges progressively.

The angular relationship of the arms 201a and 201b of plate 201 with respect to the longitudinal motion of the valves, and the degrees of motion of shaft 220, permit valve 120 to be moved downward in Fig. 6 from the low position shown, while valve 130 for all practical purposes remains in the port stations shown. Conversely when the shaft 220 rotates plate 201 counterclockwise, valve 130 emerges from the casing 119 while valve 120 holds to its port station shown.

This is a simple and neat arrangement for dividing these shift control functions.

Referring to the above rotation-longitudinal action of Fig. 5, it will be obvious that when roller 206 of arm 207 lies in notch r, the valve 130 will be in its outermost position, corresponding to reverse in Fig. 4, and when the roller lies in notch h, the valve 120 will be in 3rd or high position.

Figure 8:
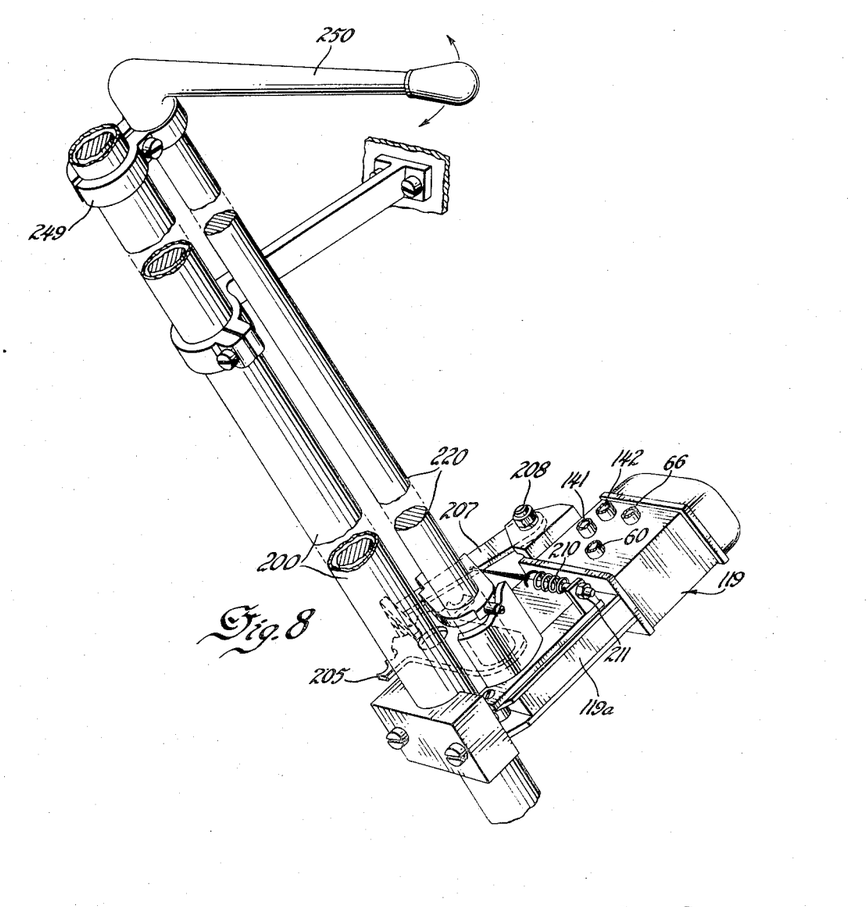
Fig. 8 is a perspective view of the mechanism of Figs. 5, 6 and 7 as installed in a vehicle.

Fig. 8 is a perspective view of the structures of Figs. 5 to 7 as installed in a motor vehicle, with the bracket 249 supporting the ratio shifting handle 250 at a point convenient to the operator's hand. The piping connecting the valve body 119 with the control system of Fig. 3 may be put in a conduit for convenience and protection, as required. Swinging of the handle 250 rotates shaft 220 for the ratio shift control functions described above.

Assuming that the car driver may shift the valve 120 to relieve the pressure in cylinder 22 while applying it to cylinder 24, for releasing clutch 5 and engaging clutch 8, and that this is done with no change in engine throttle, the clutch presure, labeled herein intermediate is cut off from line 60, and delivered to line 66. Since the torque for the fixed engine speed now is to be coupled at a lesser mechanical advantage because of the higher transmission ratio, the engine tends to slow down slightly, so that the existing pressure from the pump in delivery line 101 drops, and in the connecting passages such as 104 and 105. At the same time the degree of engine vacuum will diminish, this effect operating to change the vacuum loading on the underside of the diaphragm 156 of valve 150. The force of springs 155 and 158a is therefore varied, and the resultant effect is for the valve to rise and close off the port 151, creating a rise of pressure in 104, 105, in the control line 66, and in clutch cylinder 24.

The drop of pressure caused by slowing down the engine is partially compensated for by the dynamometric change in the degree of vacuum.

Assuming that the engine is started and that pump P of Fig. 3 is operating, the line pressure in pump outlet 101 is sufficient at idling to open valve 170, against spring 172 and to apply pressure in lines 104, 105 and 103. The valve 160 begins to function differentially providing fractional pressure in port 124 and maximum pressure in port 126 of valve 120. Since the degree of vacuum in the engine manifold is relatively high at idling, and will diminish as torque is applied or the throttle opened, and equilibrium will be established between the force of the idling vacuum below diaphragm 156 and the force of springs 155 and 158a, resulting in cracking valve 150 so as to establish a given lower line pressure in 104 and 105, carried on through port 122, transmitted through port 123 to line 60, and clutch cylinder 22.

With valve 130 now in neutral position, there is no drive since neither of brakes 25 or 30 are energized. The driver may warm up the engine by opening the throttle, which causes a variation of degree of vacuum force in chamber 158 below valve 150, and also causes a rise in pump line pressure in 101 and connected passages. The actual available loading pressure range on clutch 5 by piston 6 may vary between predetermined design limits.

Shifting of the controls of Figs. 5 to 7 to 2nd speed ratio moves valve 120 down to the 2nd position indicated in Fig. 3, delivering maximum line pressure from 103—107 and port 126 to port 133 and line 141 when piston 34 in cylinder 35 is loaded with full pump line pressure. Since the loading of clutch 5 by piston 6 is with a predetermined reduced pressure conditioned by the state of the engine manifold vacuum, the torque reaction at once assumed by band 30 is of a higher relative value than the torque capacity of the clutch 5, whereupon clutch 5 will slip momentarily, until such time as the effective clutch loading pressure rises in cylinder 22 for the clutch to sustain its full torque without slip.

Attention is directed to the action of valve 150 controlled by the engine vacuum. The springs 155 and 158a are always endeavoring to close the port 151 for building up the line pressure in 104—105 to maximum, whereas a high degree of vacuum draws the diaphragm 156 down, to open the valve 150, reducing the net effective pressure in 104—105. As the engine throttle advances, and torque is transmitted, the degree of vacuum force diminishes to permit the calibrated springs 155 and 158 to increase their force for closing the port 151 and causing a graduated rise of pressure in 104—105. This action correlates throttle opening and engine torque with the loading pressure determining clutch capacity so that regardless of the instantaneous power being deliver the ratio shift and the take up of clutch torque always proceeds with smoothness.

In addition, the valve 110 exposed to clutch loading pressure in passages 60 and 62, seats with a force depending upon engine speed, so that if the operator has suddenly depressed the accelerator pedal to full throttle position, the quick rise of engine speed will cause valve 110 to connect line 62 to full line pressure which results in a fast rise of clutch loading pressure on plate 5.

The clutch piston 6 is therefore subject not only to variable pump pressure, and to variations in torque demand, but also to speed, during the drive initiating operation.

One of the difficulties in the past, with transmission ratio changing clutches controlled by centrifugal means has been their tendency to hang or linger in engagement when the vehicle is suddenly decelerated, due to a desire on the part of the designer to maintain higher gear drive down to a low vehicle speed. The present invention solves this difficulty by utilizing the quick release effect of the centrifugal valves for the clutches assisted by the variation of vacuum force acting on the line pressure control valve 150. With the present invention, it is possible to brake the forward motion of the vehicle suddenly, and obtain clutch release quickly, and as quickly restore drive by accelerating the engine, without changing speed ratio, or stalling the engine.

The control operation of a vehicle equipped with this invention is simple and foolproof. There is no main clutch and no need for one. The drive mechanism is fully protected against whatever an inexperienced driver may do.

When the engine is started, pump P provides servo and control pressure. The valves 120, 130 are positioned such that no drive can occur, the valve 120 delivering pressure to feed line 60 for clutch A from line 104, and delivering pressure from line 107 to cross port 133, but valve 130 blocks 133, leaving both the planetary brake lines 141, 142 connected to exhaust.

If the operator desires to warm up the engine, the spinning imparted to plate 5 serves to break the static frictions of the other drive assembly elements, and whatever air may have been trapped in the system is expelled and the active servo spaces filled.

Shift of the manual control to low energizes brake 30, and the centrifugal valve 110 operates to build up the pressure on clutch A as engine speed rises, as described preceding, the low gear torque thereupon being developed on shaft 50, to move the vehicle, whereupon pump P' begins to contribute pressure to the servo feed system, via line 101' and check valve 99. Shift to 2nd, speed ratio cuts off the pressure from line 60 of clutch A and feeds pressure to line 66 of clutch B while brake 30 remains engaged, and valve 110', designed to become effective at a higher engine speed, regulates the timing of engagement of clutch B.

If during these operations the engine throttle is being advanced or retarded, the dynamometric rise or fall of the engine manifold degree of vacuum moves diaphragm 156 to relieve or restrict pressure in lines 103, 104 and 105 so that the net effective pressure on the clutches A and B and in the brake cylinder 35 is increased or decreased with torque demand, which provides against excessive clutch slip, and further, assures that the existing torques during a shift interval will be within predetermined differential values, which expedient avoids shock on the drive mechanism.

This enables the operator to utilize a full engine torque shift since the drop in vacuum force acting on the diaphragm of valve 150 of Fig. 5 causes the valve to close and provide an immediate rise in the servo line pressure sustaining the clutches and the reaction brake 30.

Shift to 3rd releases the brake 30, and reapplies the clutch A, to establish direct drive.

The hand control of Figs. 5 to 8 may be maneuvered at will to suit the driving needs, and the regulation of the torques, the required division or overlap of the torques between the clutches, and the torque reaction force on the brake 30 occurs automatically so as to eliminate shock, as described.

This description is not theoretical, but represents actual experience with the structures herein described, and similar structures, extending over a long time period of tests.

The shift to reverse from neutral merely delivers pressure from line 107 through cross port 133 to line 142 for cylinder 29 of brake 25, while clutch A connects the engine to shaft 7, as hereinbefore described, and the vehicle may be handled over soft or slippery surfaces with facility, in forward and reverse shifts, since the refined control over the action of clutch A provided by valves 150 and 110 eliminates sudden torque changes which might otherwise lose traction.

Attention is directed to fluid pressure connection 98 in Fig. 1 between clutch pressure passage 62 and the inner end of valve 110'. The passage 98, whenever there is clutch loading pressure being exerted in 62, delivers pressure to the inner face of valve 110', simulating centrifugal force in shifting valve 110' to its outermost position. When the passage from port 116' of valve 110' is delivering manually directed pressure for loading clutch B, if there is pressure in passage 62, valve 110' will be in outer position, and clutch B is in effect controlled for loading by the status of pressure in the other clutch loading line 62. When direct drive is to be had, the clutch B will be controlled for loading, in part by the operation of the loading pressure directed to clutch A, and conditioned by the speed effect on valve 110.

The cross-connection 98 is a useful feature not believed shown in the prior art. The selective adjustment feature of the pressure level ranges for the clutches and brakes with changes in the selection of ratio by the manual ratio-shift valving is likewise believed novel.

The present invention, by virtue of the features described, provides unusual advantages in ease of manipulation of the drive controls, since the relative torques required to be handled by the clutches are wholly automatically controlled over the entire speed ratio and power range of the vehicle power plant for all of the driving conditions of acceleration, deceleration, steep gradients, sudden stops and rapidly changing traction.

The advantages of the particular form of combination planetary gear and double-input clutch drive are believed obvious as set forth above, and as stated at the beginning of this specification. The novel disclosure of the fluid pressure control system, in which there is complete manual selection of ratio, and automatic actuation graduating the initial and ratio transfer torques, is believed clearly set forth herein so that persons skilled in the art may now build devices like the one described, in which wholly smooth changes of ratio may be made at will, at all times, without stalling the engine, without excessive clutch slip or abrupt torque shocks, which advantages are well-known as desirable.

The references made herein to the patents to Maybach, to Carnegie and to Thompson are for the purposes of showing proper art background for features of clutch control improvement herein above described, and the specifications herewith are believed to describe the present invention as distinct from whatever inventions are embodied in the stated references.

The present invention has particular utility when installed in a relatively light-weight vehicle having a fast engine of high activity factor, since the operation results give exceptional usage for quick acceleration or deceleration, high speed drive and quick maneuvering such as required of military jeeps, police cars, light combat, dispatch and emergency vehicles of equivalent operating demand.

It is to be observed that in the installation, as above described, there is little to wear out, nor need for frequent service, since the adjustments of the system once determined stay as set, indefinitely, and because all parts run in a constantly renewed oil bath, there is always lubrication, and opportunity to conduct heat away.

It is to be understood that while the invention has been described in connection with a specific embodiment, the principles involved are available for numerous other applications which after knowledge of the herein described invention is obtained by persons skilled in the art, will readily find adaptation in equivalent forms. The invention is therefore to be limited only as described by the scope of the appended claims.

In the claims:

1. A fluid pressure-sustained friction clutch adapted to connect power and load shafts, said clutch being equipped with a fluid pressure responsive actuator member operative to load the clutch for sustaining a range of driving torque values, a pressure conduit connected between said member and a ratio control valve for applying fluid pressure to load the member, a fluid pressure supply including a pump, a pump outlet passage, and a pump pressure regulating valve in said passage operative to relieve pressure variably from said passage and thereby provide therein a predetermined range of loading pressures available for actuating said clutch member, said ratio control valve adapted to connect said passage and said conduit, a pressure supply line joining said outlet passage and said ratio control valve, an arrangement of porting in said ratio control valve wherein positioning of the valve is operative to cause releasing and engaging action of said clutch by said line pressure, a pressure divider valve disposed in said line and operatively connecting said ratio control valve to said passage so as to establish predetermined levels of fluid pressure effective upon said actuator member, a connection between one port of said porting and a pressure outlet connection of said pressure divider valve effective to provide a variable pressure in the actuator when said ratio control valve is moved to one position for selective actuation of said clutch actuator member, and a separately acting valve connected in said conduit and arranged to relieve variably a portion of said conduit pressure, said latter-named valve diminishing the said relieving action in accordance with the rise of rotational speed of one of said shafts and thereby regulating the rate of change of said actuator pressure upon said member.

2. The combination set forth in claim 1, in which said separately acting valve is movable in response to the speed of said one of said shafts and has a relief port variably opened by said separately acting valve in its movement and effective to create a rise of clutch loading pressure in said feed line and in said actuator, with increase of speed of rotation.

3. The combination set forth in claim 1, in which said pressure divider valve has differential pressure areas exposed to the pressure of said pump outlet passage, a spring operative to oppose the action of pressure acting on said differential areas of said valve, and a second line from said divider valve effective to deliver a pressure below that in said passage to said conduit when the ratio control valve is operated to connect the second line and the conduit.

4. In a fluid-pressure-operated clutch control for transmitting the drive of an engine including an engine shaft, a driven shaft, a friction clutch for connecting said shafts having mating members one of which is movable, said control including a clutch-load piston for said movable member operable under an increase of loading force to hold said clutch engaged, a clutch actuator cylinder for the said piston, a clutch actuator feed line connection, a supply pump having a pressure outlet and a regulator valve, a pump supply line and a pressure delivery line, control valving operative to direct pressure from said supply line to said delivery and feed lines or to cut off the said directed pressure, and a device operative to respond to the intake manifold pressure of said engine and effective upon said regulator valve for causing said regulator valve to increase the effective pressure of said supply and delivery lines with increase of intake manifold pressure.

5. The combination set forth in claim 4, in which said engine is equipped with an induction manifold and in which said device includes a movable member connected to respond to pressure variations induced in said induction manifold by the operation of said engine under varying loads and said member being effective to move said regulator valve to increase the supply and delivery line pressure with an increase in said manifold pressure indicative of increased engine loads.

6. The combination set forth in claim 4, in which there is a centrifugal valve mounted to be rotated by said engine and controlling said feed line pressure, and also responding to the existing pressure of said actuator space for providing a variation in the degree of loading pressure in said space varying with the centrifugal force caused by rotation of said valve.

7. In power controls, an engine whose torque rises with speed, a friction clutch adapted to couple the engine shaft with a driven member wherein said clutch transmits variable torque therebetween, a pressure supply passage, fluid pressure actuating means for said clutch supplied from said passage and operative to respond to provide said variable clutch torque, a conduit leading to said actuating means, a fluid pressure supply for said passage including a pump, a pump line pressure regulating valve connected to said passage, control valving operative to direct the supply pressure from said passage to said conduit and said actuating means or to relieve the pressure therefrom while shutting off the said supply pressure of said passage, a plurality of pressure determining valves for said actuating means, one of which is said line pressure regulating valve which is responsive to variations in engine torque demand and another of which is weighted to respond to changes of engine speed and is connected to said conduit, said valve which responds to torque demand being operative to vary the pressure of said passage which acts upon said actuating means so as to increase the clutch loading pressure with increase in torque demand on said engine.

8. In controls for power transmission devices, an engine, an engine shaft, a plurality of friction clutches adapted to be coupled selectively to said engine shaft, fluid pressure actuators for said clutches, a pressure supply, pressure connections leading to said actuators, a control valve assembly including valving arranged to deliver the pressure selectively from said supply to said actuators through said connections, valves for providing variable clutch actuation pressure to said valving and said connections from said supply at different predetermined levels of pressure in accordance with the selection action of said pressure-directing valving, a valve included in said control valve assembly operative to vary the clutch-actuating pressure provided by said assembly to said actuators and a device responding to variations of induction pressure of said engine effective to move said last-named valve variably in accordance with the variations of torque demand on said engine, so as to raise the clutch actuation pressure with increased pressure on said device.

9. The combination set forth in claim 8, in which there is a clutch-actuator relief valve operative to respond to the speed of said engine and thereby to increase the actuator pressure with increase of speed, and operative to respond to the pressure of said pressure levels for relieving the said actuator pressure in accordance with fall of speed.

10. In transmission driving assemblies having plural input clutches for changing transmission step ratios, the combination of plural friction clutches which are normally disengaged, and are engaged by applied fluid pressure acting upon pressure responsive pistons for said clutches respectively, of fluid pressure supply and pressure feed lines connected to cylinders containing said pistons with means to vary the effective pressure applied by said pistons to vary the torque capacities of said friction clutches, valving for controlling the loading of two of said clutches including two centrifugally operated valves one for each clutch, said valves being separately responsive to speed for creating rise of clutch pressure with speed, clutch selection control means for said valving effective to direct the pressure of said supply to said two valves and to said feed lines and a pressure passage connecting one of said feed lines to the centrifugally operable valve of the other of said feed lines operative when pressure exists in the first said feed line to cause the said valve of the other feed line to deliver pressure to the said other feed line whereby to establish drive by the two clutches fed from both said feed lines.

11. In power controls, an engine providing the useful range of power in which its effective torque rises with speed, and engine shaft, a driven shaft, a friction clutch adapted to couple said shafts at variable torque capacity, fluid pressure actuating means operative to furnish predetermined ranges of loading pressure to said clutch, a fluid pressure supply adapted to provide said means, controls connected to the engine and subject to the variations in the intake manifold pressure of said engine and speed of the engine, a responding element of said controls connected to said actuating means and operative thereupon to increase the clutch loading pressures furnished to said clutch in accordance with the increase of engine manifold pressure, and a mechanism of said controls responding to the speed of said engine and likewise operative upon said actuating means to increase the clutch loading pressures in accordance with a predetermined rise of the speed of said engine.

12. In power drive devices, the combination of a variable speed engine, an engine shaft, an induction space of said engine in which the net effective pressure varies with engine power, a driven shaft, a friction clutch adapted to connect the shafts having a movable member, a fluid pressure actuator arranged to load said member for causing engagement of the clutch, a resistance means adapted to oppose the fluid pressure force applied to said actuator, a fluid pressure system for furnishing variable fluid pressure loading force to said actuator against the said means, a fluid pressure supply for said system, pressure varying valving included in said system, a set of fluid pressure passages of said system connected to said supply, to said actuator and to said valving arranged to provide a variable pressure to said actuator, a selector valve adapted to cut off the pressure of said supply from said actuator or to connect same with selected position of said valve, a valve of said valving subject to the speed of rotation of one of said shafts for providing a rise of the clutch actuator pressure with speed increase and for providing relief of said actuator pressure at a predetermined low speed and a second valve of said valving subject to the induction pressure and therefore to the power characteristics of said engine to provide an effective actuator pressure rising with power demand, said latter two valves of said valving being operative during the interval when said selector valve is in actuator-connecting position.

13. The combination set forth in claim 12, in which said speed responsive valve is radially movable in a rotating housing, and having an exhaust port in said housing, a pressure delivery port located radially inward of said exhaust port and connected to one of said actuator-connected passages, a pressure feed port located radially inward of said delivery port, a differential pressure space located radially inward of said feed port and connected to said delivery port, and a boss of said valving having an outer reduced diameter portion operative in one radial position to connect said exhaust and delivery ports, said boss having an inner reduced diameter portion operative to connect said feed port and said differential pressure space, and a larger boss of said valve located radially inward of said first-named boss and subject to the delivered pressure in said space and said connected delivery port such that the rise of speed causing said valve to move radially outward is opposed by the resisting pressure of said differential pressure space.

14. A fluid pressure clutch control system for variably loading a friction clutch and operative for varying the clutch torque capacity, said system including a clutch loading piston in a cylinder, a pressure conduit connected to said cylinder, a source of fluid pressure adapted to supply said cylinder and said conduit, an output passage from said source, pressure directing valving operative to deliver pressure fluid from said passage to said conduit and said cylinder, or to cut off said supply while venting said conduit and cylinder, pressure-determining valves, one in said passage responsive to the torque demand of an engine and another in said conduit responsive to engine speed effective to vary the relief of the pressure acting upon said piston and thereby effective to determine the degree of effective clutch loading pressure existing in said conduit and cylinder, a pressure divider valve operative by fluid pressure to determine one of two levels of pressure made available from said passage for loading said clutch, said last-named valve being connected between said output passage and said pressure directing valving, a positioning control member effective to select the operation of said pressure directing valving and position same for causing actuation of said clutch loading piston, and a pressure line between said pressure divider valve and said pressure directing valving operative to deliver a reduced level of pressure from said pressure valve to said conduit and cylinder in one setting of said control member.

15. The construction set forth in claim 14 in which said torque demand responsive pressure determining valve controls the total directed pressure derived from said source, and having an engine shaft connected to drive said clutch from said engine, a driven shaft driven by said clutch, an engine induction space in which the pressure varies with the torque demand on said engine shaft, said clutch loading piston including a friction surface rotating with the said engine shaft and a mating clutching member rotatable with said driven shaft, and a device connected to said induction space and operable by variations in the said induction pressure to vary the action of said torque demand responsive valve and thereby vary the effective pressure in said cylinder, and operative to cause said torque demand responsive valve to provide a given pressure to load the said loading piston at one controlling induction pressure and to provide a greater clutch-loading pressure for said piston at a greater controlling induction pressure.

16. A power control comprising in combination a driving shaft, a driven shaft, a pair of fluid pressure operated clutches for connecting the shafts in different speed ratios, means for supplying fluid under pressure, a pair of conduits connected to the supply means and each connectible to one of said clutches, pressure regulating means for reducing the pressure between said supply means and each of said conduits, said regulating means being adapted to establish one pressure in one conduit and a different pressure in the other conduit, and means responsive to the torque demand of the engine for changing the pressure in both conduits.

References Cited in the file of this patent

UNITED STATES PATENTS

| | | |
|---|---|---|
| 1,938,914 | Kress | Dec. 12, 1933 |
| 1,991,124 | Sharpe | Feb. 12, 1935 |
| 2,094,449 | Forichon | Sept. 28, 1937 |
| 2,105,429 | Maybach | Jan. 11, 1938 |
| 2,120,104 | Livermore | June 7, 1938 |
| 2,143,321 | Kegresse | Jan. 10, 1939 |
| 2,144,074 | Maybach | Jan. 17, 1939 |
| 2,150,950 | Thoma | Mar. 21, 1939 |
| 2,208,865 | Gette | July 23, 1940 |
| 2,212,740 | Iavelli | Aug. 27, 1940 |
| 2,214,201 | Moulder | Sept. 10, 1940 |
| 2,221,393 | Carnegie | Nov. 12, 1940 |
| 2,280,329 | White | Apr. 12, 1942 |
| 2,297,480 | Kratzmann | Sept. 29, 1942 |
| 2,299,079 | Davis | Oct. 20, 1942 |
| 2,310,518 | Dolza | Feb. 9, 1943 |
| 2,328,091 | Nutt et al. | Aug. 31, 1943 |
| 2,376,545 | Livermore | May 22, 1945 |
| 2,467,829 | Hornbostel | Apr. 19, 1949 |
| 2,528,585 | Farkas et al. | Nov. 7, 1950 |

FOREIGN PATENTS

| | | |
|---|---|---|
| 496,466 | Great Britain | Nov. 30, 1938 |